(12) United States Patent
Hamilton et al.

(10) Patent No.: US 8,769,236 B2
(45) Date of Patent: Jul. 1, 2014

(54) REMOTE DIFFERENTIAL COMPRESSION APPLIED TO STORAGE

(75) Inventors: James R. Hamilton, Bellevue, WA (US); Ruston Panabaker, Redmond, WA (US); John Mark Miller, Kirkland, WA (US); William J. Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1135 days.

(21) Appl. No.: 12/103,340

(22) Filed: Apr. 15, 2008

(65) Prior Publication Data

US 2009/0259675 A1 Oct. 15, 2009

(51) Int. Cl.
*G06F 13/00* (2006.01)

(52) U.S. Cl.
USPC .................................. 711/173; 711/E12.084

(58) Field of Classification Search
None
See application file for complete search history.

(56) References Cited

U.S. PATENT DOCUMENTS

| | | | |
|---|---|---|---|
| 5,699,539 A * | 12/1997 | Garber et al. ..................... 711/2 |
| 6,904,430 B1 | 6/2005 | Livshits |
| 7,243,186 B2 | 7/2007 | Liang et al. |
| 2005/0256974 A1 | 11/2005 | Teodosiu et al. |
| 2006/0085561 A1 | 4/2006 | Manasse et al. |
| 2006/0184652 A1* | 8/2006 | Teodosiu et al. ............. 709/221 |
| 2007/0255853 A1* | 11/2007 | Toutonghi .................... 709/246 |
| 2009/0037672 A1* | 2/2009 | Colbert et al. ................ 711/154 |
| 2009/0049260 A1* | 2/2009 | Upadhyayula ................ 711/162 |
| 2009/0234892 A1* | 9/2009 | Anglin et al. .................. 707/201 |
| 2012/0158674 A1* | 6/2012 | Lillibridge .................... 707/692 |
| 2012/0191669 A1* | 7/2012 | Kennedy et al. .............. 707/692 |
| 2013/0013865 A1* | 1/2013 | Venkatesh et al. ............. 711/133 |
| 2013/0046733 A1* | 2/2013 | Sakuraba et al. ............. 707/640 |
| 2013/0086007 A1* | 4/2013 | Bandopadhyay ............. 707/692 |

OTHER PUBLICATIONS

Teodosiu et al., Optimizing File Replication over Limited-Bandwidth Networks using Remote Differential Compression, Nov. 2006, Micorsoft Corporation.*

Dan Teodosiu, et al. Optimizing File Replication over Limited-Bandwidth Networks using Remote Differential Compression ftp://ftp.research.microsoft.com/pub/tr/TR-2006-157.pdf. Last accessed Oct. 25, 2007, 16 pages.

Andrei Z. Broder. On the Resemblance and Containment of Documents ftp://ftp.digital.com/pub/DEC/SRC/publications/broder/positano-final-wpnums.pdf. Last accessed Oct. 25, 2007, 9 pages.

Nikolaj Bjorner, et al. Content-Dependent Chunking for Differential Compression, the Local Maximum Approach http://research.microsoft.com/~gurevich/Opera/190.pdf. Last accessed Oct. 25, 2007, 93 pages.

(Continued)

*Primary Examiner* — Sean D Rossiter

(74) *Attorney, Agent, or Firm* — Dan Choi; Carole Boelitz; Micky Minhas

(57) ABSTRACT

Oftentimes, computer files, information packets, and the like share identical data portions that cause duplicate storing. The files and/or packets can be logically divided and checks can be performed to determine if there are shared portions. If shared portions exist, then as opposed to making a duplicate copy of information, a pointer can be produced that identifies where the portion is saved. In addition, pointers can be used in compression of information such that a compressed file can identify an original copy—the original copy can be used to decompress the information.

20 Claims, 10 Drawing Sheets

(56) References Cited

OTHER PUBLICATIONS

Greg Ungerer. Using Flash memory with uClinux, Sep. 21, 2002. http://linuxdevices.com/articles/AT6850006074.html. Last accessed Oct. 25, 2007, 8 pages.

Antone Gonsalves. Seagate Combines Flash Memory, Hard Disk for Notebook Storage, Oct. 9, 2007. http://www.itnews.com.au/News/62697,seagate-combines-flash-memory-hard-disk-for-notebook-storage.aspx. Last accessed Oct. 25, 2007, 2 pages.

* cited by examiner

← 300

| A | B | C | D | E | F | G | H | I | J | K | L |
|---|---|---|---|---|---|---|---|---|---|---|---|
| NO |||||||||||||

CHECK 1

| A | B | C | D | E | F | G | H | I | J | K | L |
|---|---|---|---|---|---|---|---|---|---|---|---|
| NO |||||| NO ||||||

CHECK 2

| A | B | C | D | E | F | G | H | I | J | K | L |
|---|---|---|---|---|---|---|---|---|---|---|---|
| YES ||| NO ||||| NO ||||

CHECK 3

| A | B | C | D | E | F | G | H | I | J | K | L |
|---|---|---|---|---|---|---|---|---|---|---|---|
| XX ||| NO || NO ||| YES || NO ||

CHECK 4

| A | B | C | D | E | F | G | H | I | J | K | L |
|---|---|---|---|---|---|---|---|---|---|---|---|
| XX ||| NO | NO | YES | NO | NO | XY || NO | YES |

CHECK 5

| XX | D | E | YY | G | H | XY | K | YX |
|---|---|---|---|---|---|---|---|---|

SAVE

FIG. 3

REMOTE DIFFERENTIAL COMPRESSION APPLIED TO STORAGE

TECHNICAL FIELD

The subject specification relates generally to data storage and in particular to using pointers to improve data storage.

BACKGROUND

Common network systems employ at least one server that communicates with a plurality of different personal electronic devices, where the devices can communicate and share data. For example, employees in an office often have individual applications saved to their workstations such as a word processing or electronic mail application. The workstations communicate to a server with a common storage location, such that a user can retain a file upon the common storage accessible by other employees. If another employee desires to use the retained file then she can open the file with her local application and perform appropriate operations. Appropriate operations may include making changes, adding comments, and the like. In addition to retaining the copy of the file on the common storage location, a user can retain a copy on her local application. A network can become littered with nearly identical files if many users retain local copies in addition to the shared copy.

In addition to retaining files in more than one location, a user can have multiple files of similar information retained upon one or more personal devices. When files are retained upon a personal device, multiple '.pst' files can be stored. In such a situation, the multiple files have a large amount of duplicate information. A user can also retain multiple copies of a file upon more than one device. For example, a vacation photograph can be saved upon a camera, mobile device, and personal computer hard drive.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

When a request is made to save information upon a storage medium, a save is created without regards to redundant data or storage location. Redundant information retained could consume valuable storage space. For instance, in a business setting, multiple users networked can have redundant application files stored on their computers, which consumes storage space. To alleviate this problem, lossy compression is used to minimize the amount of storage space occupied by a piece of information. A negative side of lossy compression is a loss of data, which cannot be retrieved upon decompression.

With the disclosed innovation, multiple checks and divisions can take place upon an information piece to determine if there is redundancy. If redundancy is identified for an information piece, then a main copy is retained and any supplemental copy is replaced with a pointer. This pointer stands in lieu of a supplemental copy and reduces redundancy. According to one embodiment of this innovation, analysis can be performed to identify an improved location for the main copy.

When information is compressed in a lossy manner, some information cannot be obtained upon decompression. For instance, a lossy compressed photograph loses detail that cannot be recaptured. This innovation creates a pointer that allows information to be obtained previously lost during lossy compression. If the aforementioned photograph is copied and compressed through lossy techniques, then the pointer can direct to the original photograph. Thus, original information can be restored while taking advantage of benefits of lossy compression.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

BRIEF DESCRIPTION OF THE DRAWINGS

FIG. 3 illustrates a representative logical data division progression in accordance with an aspect of the subject specification.

DETAILED DESCRIPTION

Figure 1:
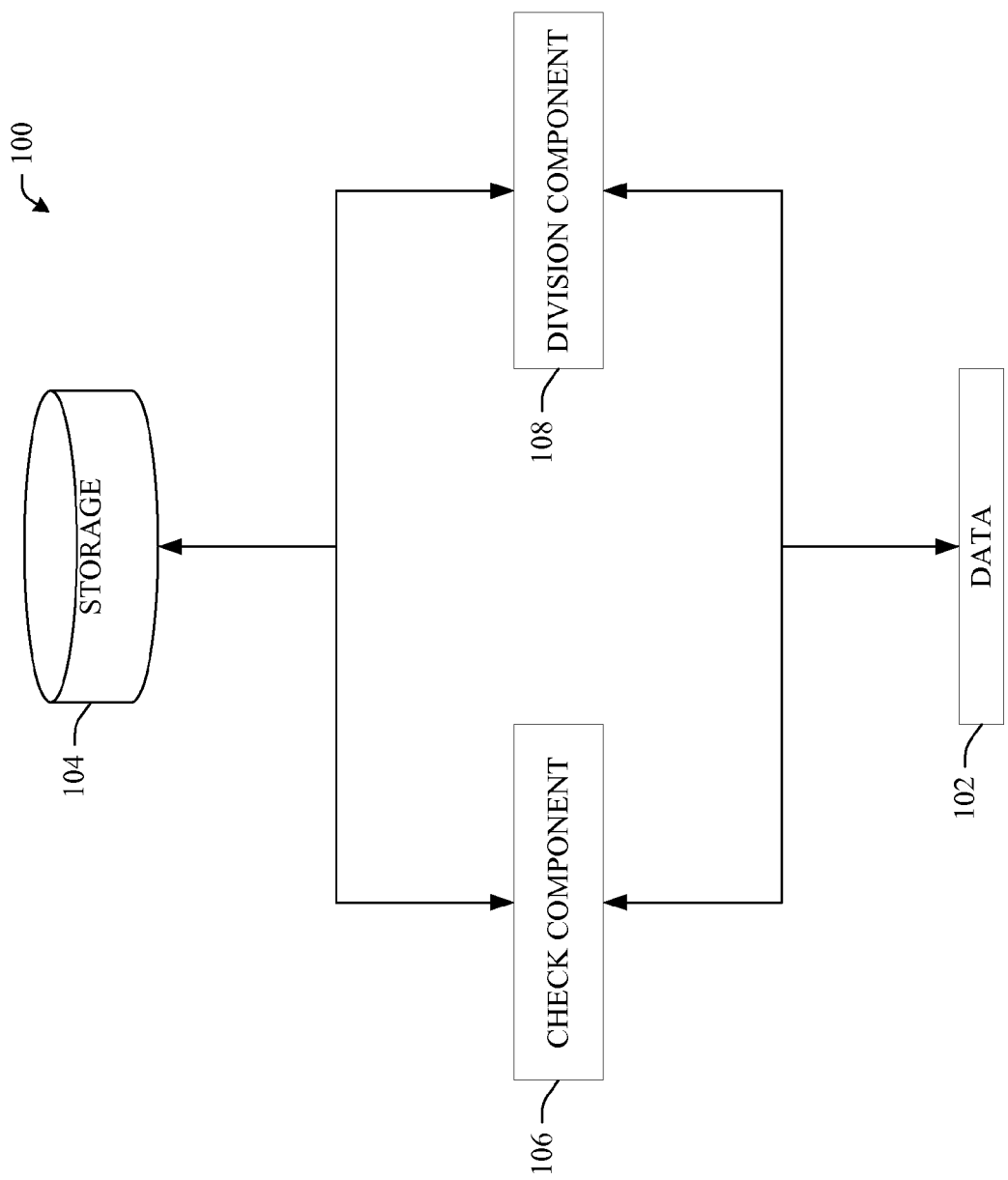
FIG. 1 illustrates a representative system for storing data in an efficient manner in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. It is to be appreciated that determinations or inferences referenced throughout the subject specification can be practiced through use of artificial intelligence techniques.

Now referring to FIG. 1, an example system 100 is disclosed for efficiently managing storage. Oftentimes, computer systems encounter redundancy of storage that slows performance and consumes valuable memory. The redundancy can take place upon a single device and multiple storage locations in a network. Not only are multiple versions of files commonly stored, but also similar files with redundant portions are often stored more than one time. The disclosed innovation alleviates the redundancy of similar files by saving new information while generating pointers to locations of redundant information.

A request can be collected that data 102 is to be retained upon storage 104, where storage 104 can be a single memory type such as flash memory, different types of memory in a computer system, different available memory along a network, and the like. A check component 106 can determine if the data 102 is retained upon the storage 104. This determination can be made base upon a number of different configurations, such as through scanning storage 104, making a request to a mobile device if data is retained locally, and the like. If it is determined that the data is stored upon an auxiliary storage location such as storage 104, then a pointer to the location can be retained in place of saving the data.

If the data 102 is not stored upon an auxiliary storage location, then a division component 108 can resolve if data processed by the check component 106 can be logically divided into at least two smaller memory units. Oftentimes, while whole files are not redundantly stored, portions of these files can be common between different files. The division component 108 determines if there is a logical manner in which to divide the data 102 commonly through artificial intelligence techniques, algorithms, pre-defined or organically developed rule, and the like. If a logical division can take place, then the data 102 is accordingly divided and the check component 106 processes the divisions. Division and checking can continue to take place until redundancy is established or the data 102 is divided to a smallest unit, oftentimes a hash.

In an illustrative instance, a user can desire to save a supplemental word processing application as data 102 upon storage 104 in addition to a primary word processing application. The check component 106 can determine that the supplemental word processing application is not saved upon the storage 104. It can then be resolved by the division component 108 that the supplemental application can be logically divided, where one of the divisions can isolate font types. The check component 106 can determine that both word processing applications have matching font types and that there is no need for redundancy. Therefore, a pointer to the primary application font file can be established with the stored supplemental application as opposed to a redundant font file.

Figure 2:
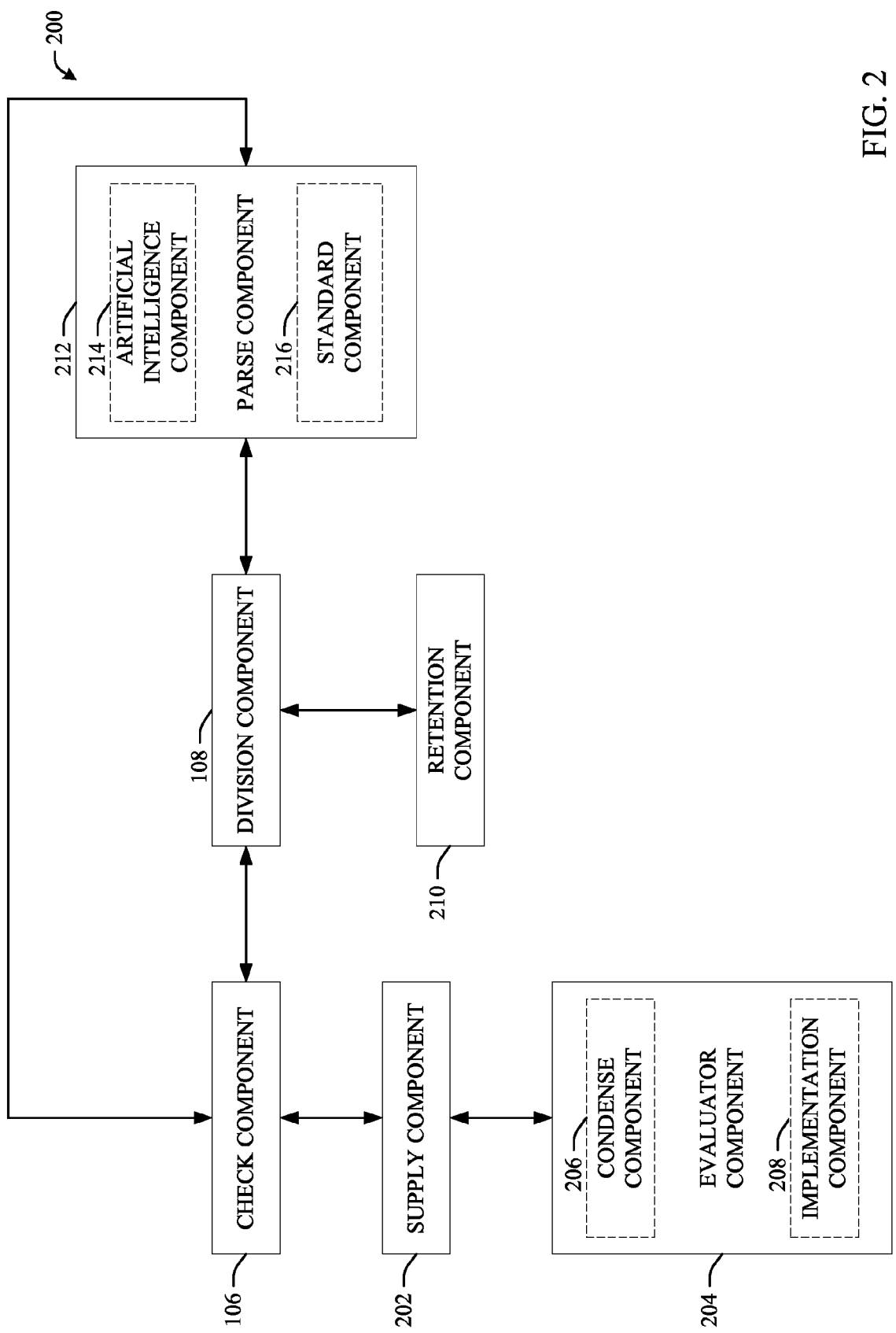
FIG. 2 illustrates a representative system for storing data in an efficient manner by attempting data division in accordance with an aspect of the subject specification.

Now referring to FIG. 2, an example system 200 is disclosed detailing retaining information in an efficient manner. A check component 102 can initially conclude if a memory unit that is designated for storage is retained upon an auxiliary storage location. If it is determined that the memory unit is retained elsewhere, then a pointer can be generated by a supply component 202 that is to replace the saved information, thus reducing redundant storage. The pointer can direct a requestor for the information where to locate the information.

While the supply component 202 produces a pointer to the memory unit when the memory unit is retained upon the auxiliary storage location, it does not necessarily point to an existing storage location. The system 200 can attempt to optimize storage by placing information upon an improved storage device/medium and retaining pointers upon inferior devices/mediums. An evaluator component 204 can select an appropriate storage medium/device for data. For example, a file can initially be stored upon a low performance memory type. However, an attempt to save a redundant copy can indicate that the data is to be used by multiple programs and thus has a likelihood of benefiting from residing upon a higher performance memory. The evaluator component 204 can perform analysis to determine an optimal configuration for a system. The selection can be based upon at least one economic factor such as price, at least one performance factor such as access speed, at least one contextual factor such as likelihood of physical removal of storage, or a combination thereof.

In order to save storage space, a condense component 206 can be used that compresses a copy of the memory unit, commonly through lossy compression. The evaluation component 204 can also use an implementation component 206 that places the memory unit upon the selected storage unit and places a pointer to the memory unit in at least one relevant location. Additionally, the implementation component 208 can associate the pointer with the compressed copy. The storage space designated to retain information can be new location that has not previously held the data and/or is not selected for storage by a requestor.

If the check component 102 makes a negative determination, then a division component 106 can resolve if the memory unit processed by the check component 106 can be divided into at least two memory units logically. This occurs when the conclusion is made that the memory unit is not retained upon the auxiliary storage location. If the memory unit can no longer be logically divided, then a retention component 210 can store the data.

However, if a determination is made that the memory unit can be logically divided, then a parse component 212 can be used to divide the memory unit in a logical manner. According to one embodiment, multiple logical divisions can be available and the parse component 212 selects a logical division that creates a smallest number of sub-units and/or a largest average size sub-unit. Thus, more data can be checked for repetition and there can be a greater likelihood that less redundancy occurs.

The parse component 212 can use an artificial intelligence (AI) component 214 to determine a logical breakdown of the memory unit. The AI component 214 can make at least one determination or at least one inference in relation to memory unit division. For instance, a determination can be made that a file has inherent breaks that can be exploited and/or an inference can be made that a history of similar files added by a user can be indicative of logical division.

The AI component 214 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 214 can also include methods for capture of logical relationships such as theorem provers or more heuristic rule-based expert systems. The AI component 214 can be represented as an externally pluggable component, in some cases designed by a disparate (third) party.

As opposed to or in addition to artificial intelligence techniques, the parse component 212 can employ a structured or organic rules set for logical division facilitated by a standard component 216. A set of hierarchical rules can be followed to determine logical division, where the rule can be modified over time based upon feedback such as percentage of divisions that result in a match. In addition, the parse component 212 can use mathematical algorithms to perform logical division, as well as division through other logical manners. Once divided, the memory unit can be re-processed by the check component 106 and aspects disclosed herein can be performed upon the divided units until a match is found or division cannot occur.

Now referring to FIG. 3, an example dataset 300 shown as it is manipulated in accordance with aspects disclosed herein. The dataset can be made of twelve hashes, designated sequentially by letters A through L. FIG. 3 disclosed five different checks and then a final saved version of the dataset. Initially, a first check can take place by the check component 106 of FIG. 1 to determine if the data file as a whole is saved in another location. In the disclosed example, the data file is not saved, so an answer of 'no' is returned.

The division component 108 of FIG. 1 can determine that the data set is divisible and the parse component 212 of FIG. 2 can make a logical division. In this example, the logical division creates two equal portions, A-F and G-L. It is to be appreciated that logical division can return a same result a mathematical division. Another check can occur facilitated by the check component 106 of FIG. 1 and another result of no matches can be determined.

A subsequent division can occur such that three distinct groupings of hashes can be formed: A-C, D-H, and I-L. As opposed to a mathematical division, that could evenly divide the arranged portions, logical division enables unequal and differing combinations in an attempt to discover a match. It is to be appreciated that the groupings break away from a previous grouping such that a subsequent grouping can be distinct from a proceeding grouping.

A third check can determine that grouping A-C has a match in another location. Thus, a pointer XX to redundant information can be associated with A-C to represent that a match is found. Commonly, another parsing does not take A-C into account since it has already matched, however, other groupings can take place in an attempt to save more storage space. When other groupings take place including A-C, the pointer XX can be temporarily saved in implemented if another match with A, B and/or C is not found.

A fourth check can facilitate further division of the dataset and discover more matches, such as pointer XY. A final division can occur before a fifth check such that unmatched hashes are individually grouped, thus no smaller groupings can occur. The fifth check can determine if specific hashes match and based upon the fifth check a final save can be generated with additional pointers YY and YX. The final save can include both pointers to matched hashes in addition to non-redundant data.

Figure 4:
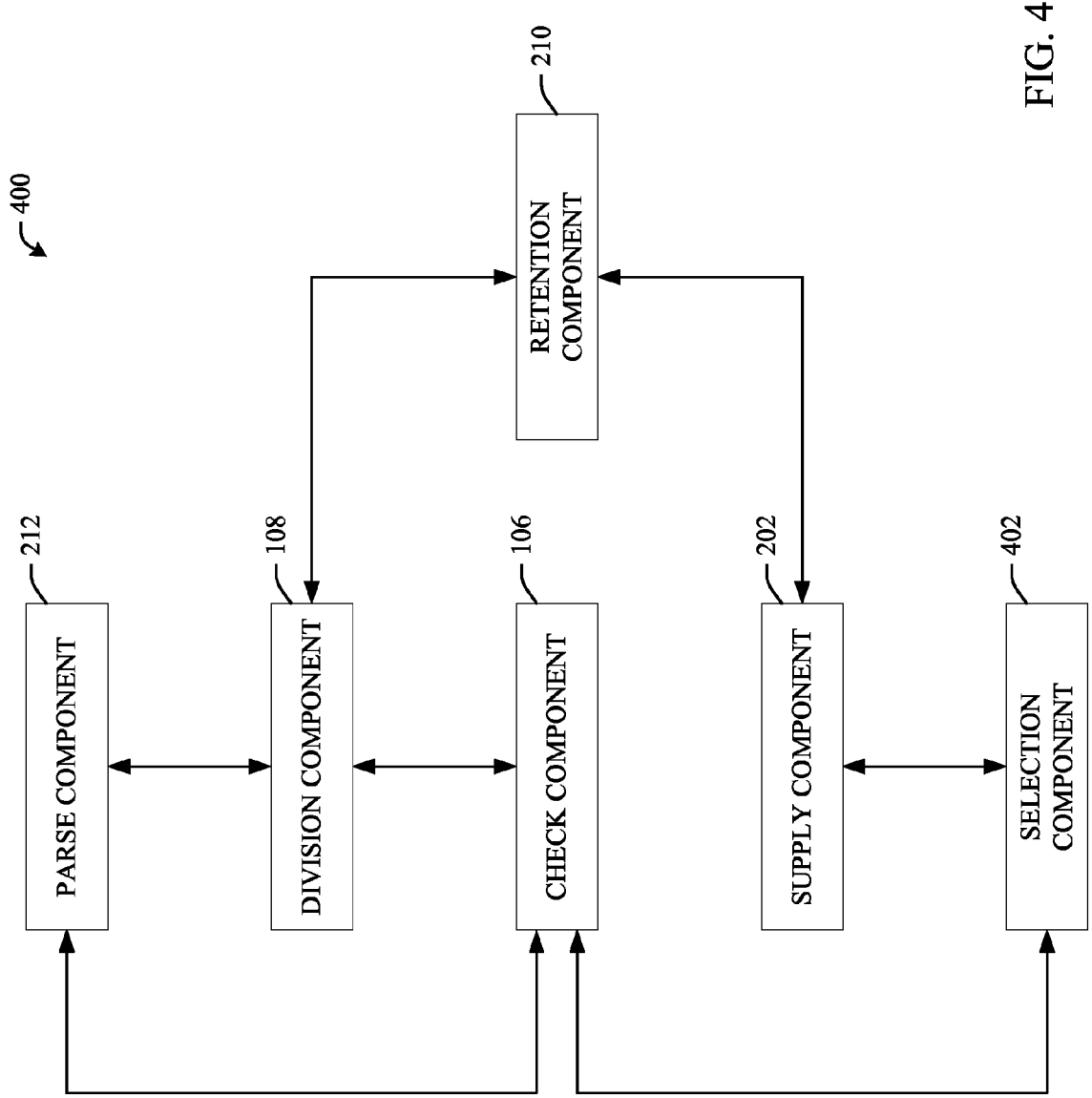
FIG. 4 illustrates a representative system for selecting an improved location for storage with efficient data storage in accordance with an aspect of the subject specification.

Now referring to FIG. 4, an example system 400 is disclosed for choosing devices upon which to store master information, pointers of matching information direct to the master information. A check component 106 can compare a dataset assigned for retention against existing saved information to determine if there is redundancy. Thus, the check component 106 can operate as means for determining if a copy of at least a portion of data requested for storage is retained upon another storage medium.

If a match is discovered, analysis of available storage locations and other metadata can be performed by a selection component 402. A choice can be made as to where data should be stored and thus locations that should retain a pointer to the information, oftentimes to optimize performance of an overall system, optimize performance with regard to the saved data, etc. According to one embodiment, information is stored initially at a primary location and a request is made to store redundant data in a supplemental location. The selection component 402 can determine data should be saved on a new tertiary location and pointers should be placed at the primary location and supplemental location. The selection component 402 can operate as means for selecting a storage device to retain a pointer and selecting a storage device to retain the data, selection is based upon a weighing of at least one economic factor, at least one performance factor, and at least one contextual factor. Moreover, the selection component 402 includes at least some of the aspects disclosed regarding the evaluator component 204 of FIG. 2 and visa versa.

The selection component 402 can determine that even if there is redundancy, a master save with appropriate pointers should not be used. For instance, a user can have a file saved upon a desktop computer and request to make a save of a file with redundant data to removable flash memory. However, since the flash memory can be removed and become out of contact with the desktop computer, a pointer can be dangerous since necessary data could become inaccessible. Therefore, the selection component 402 can perform predictions on likelihood of a storage locations separating physically, communicatively, and the like.

A retention component 210 can execute the saves, such that the pointers and data are stored in designated locations. The retention component 210 can function as means for retaining information if the data is not retained upon another storage medium and the data cannot be logically divided. Once a determination is made as to where information is to be stored and what locations are to retain a pointer, then a supply component 202 can generate a pointer to information automatically. A generated pointer can provide an address of information, as well as provide path directions on how to reach information. The supply component 202 can therefore implement as means for generating a pointer to the retained copy and preserving the pointer if a copy of at least a portion of the data is retained upon another storage medium.

If a match is not made, then a division component 108 can resolve if the information can be logically divided. If data cannot be logically divided, then it can be retained in storage by the retention component 210. The division component 108 can function as means for determining if data requested for storage can be logically divided. Data that can be logically divided can be broken down logically by a parse component 212. The parse component 212 can operate as means for separating the data requested for storage in a logical manner if the data requested for storage can be divided logically, the logical division creates the smallest number of portions that are evaluated by the means for determining and the created portions are re-processed by the means for determining.

Implementation of aspects disclosed herein can create a concentrated memory unit. For instance, a user can be in a network where a mobile device communicates with a laptop computer. The mobile device can include flash memory that retains pointers to a large portion of the storage of the laptop computer. Thus, with using limited resources, the mobile device can have access to a large amount of information.

Figure 5:
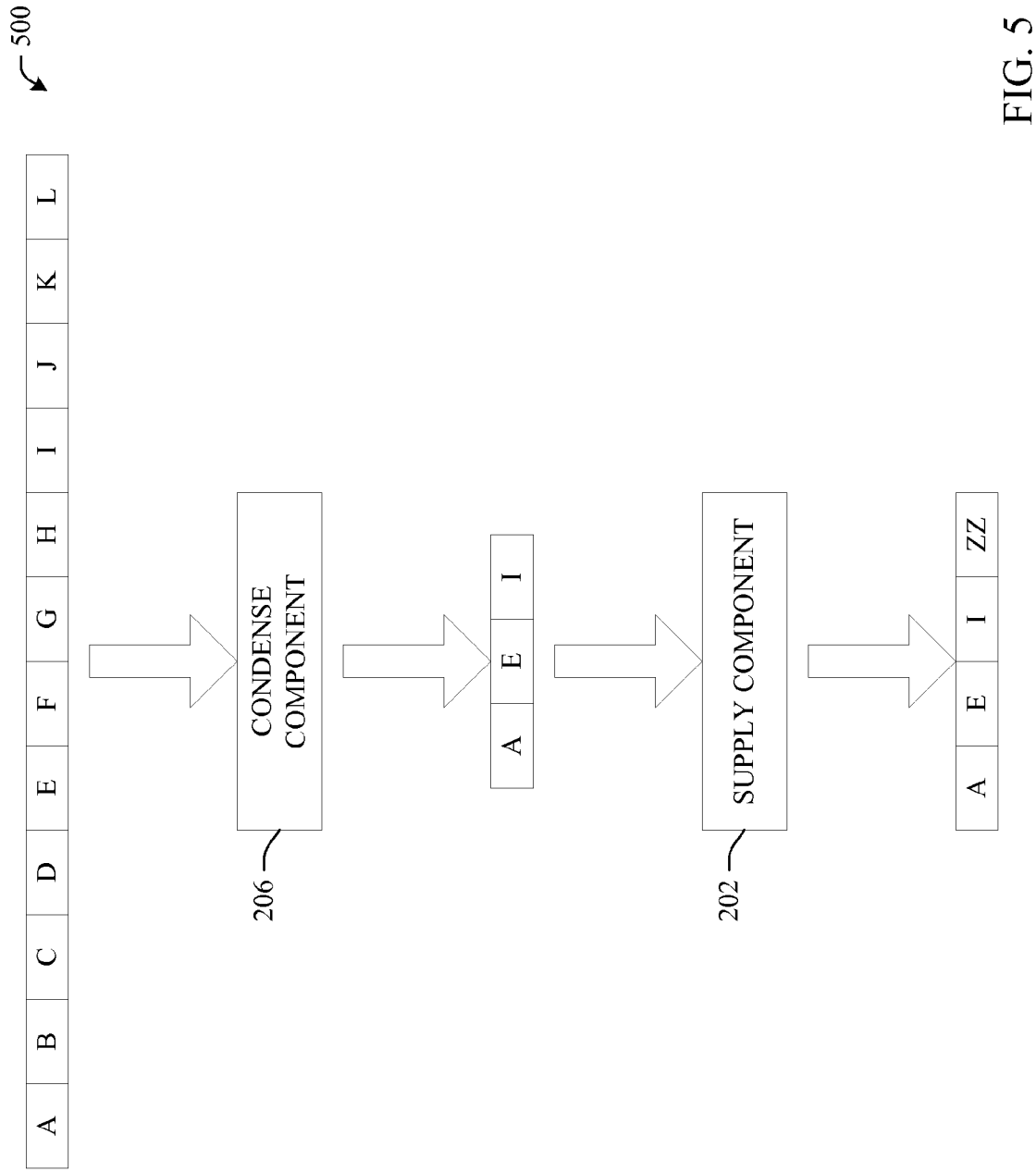
FIG. 5 illustrates a representative system for associating a pointer with compressed information in accordance with an aspect of the subject specification.

Now referring to FIG. 5, an example system 500 is disclosed for compressing information and providing a pointer to data to improve information storage. A dataset can have twelve sections designated A-L in uncompressed form, where the dataset can represent an audio file, video file, digital photograph, as well as other information. A request can be received to compress the dataset and save the condensed information in a designated location.

A condense component 206 can perform compression, oftentimes lossy compression, upon the dataset in an attempt to save available memory. A determination can be made as to an algorithm to use in order to procure compression and the condense component 206 can implement the determined algorithm. According to one embodiment, compression of the dataset can be specifically tailored to a device anticipated to utilize the compressed dataset. For example, a desktop computer can transmit a picture to a mobile device, where the condense component 206 compresses the picture before, during, or after transmission. An analysis of mobile device capabilities can be performed to determine a quality of a picture that can be displayed by the mobile device. For example, if the mobile device has a display screen that is limited in resolution, the compression can occur such that decompression of the file results in a quality that is about equal to the maximum resolution allowed by the display.

The condense component 206 can output a condensed version of the dataset, such as a compression including every fourth hash making a compression of A/E/I. Decompressing a file that is compressed through lossy techniques can produce a file that is inferior to the original dataset such that information is lost. Therefore, a supply component 202 can provide a pointer ZZ to the original dataset or to other assistance data, such as another version of the dataset condensed with a different compression algorithm. During decompression, the original dataset can be analyzed and used to assist in creating a more complete reconstruction of the dataset. According to one embodiment, decompression occurs and then the pointer is used to locate the original dataset.

Oftentimes, a compressed file can be transferred between different devices, including upon a mobile device. If the mobile device is manipulated such that the dataset can no longer be accessed, then an error can occur. The condense component 206 can also function to decompress information and use to pointer to aid in decompression. A check can be made if the pointer path is valid—if the path is not valid, then the condense component 206 can ignore the pointer and reconstruct data in a conventional manner, thus eliminating a potential error.

Figure 6:
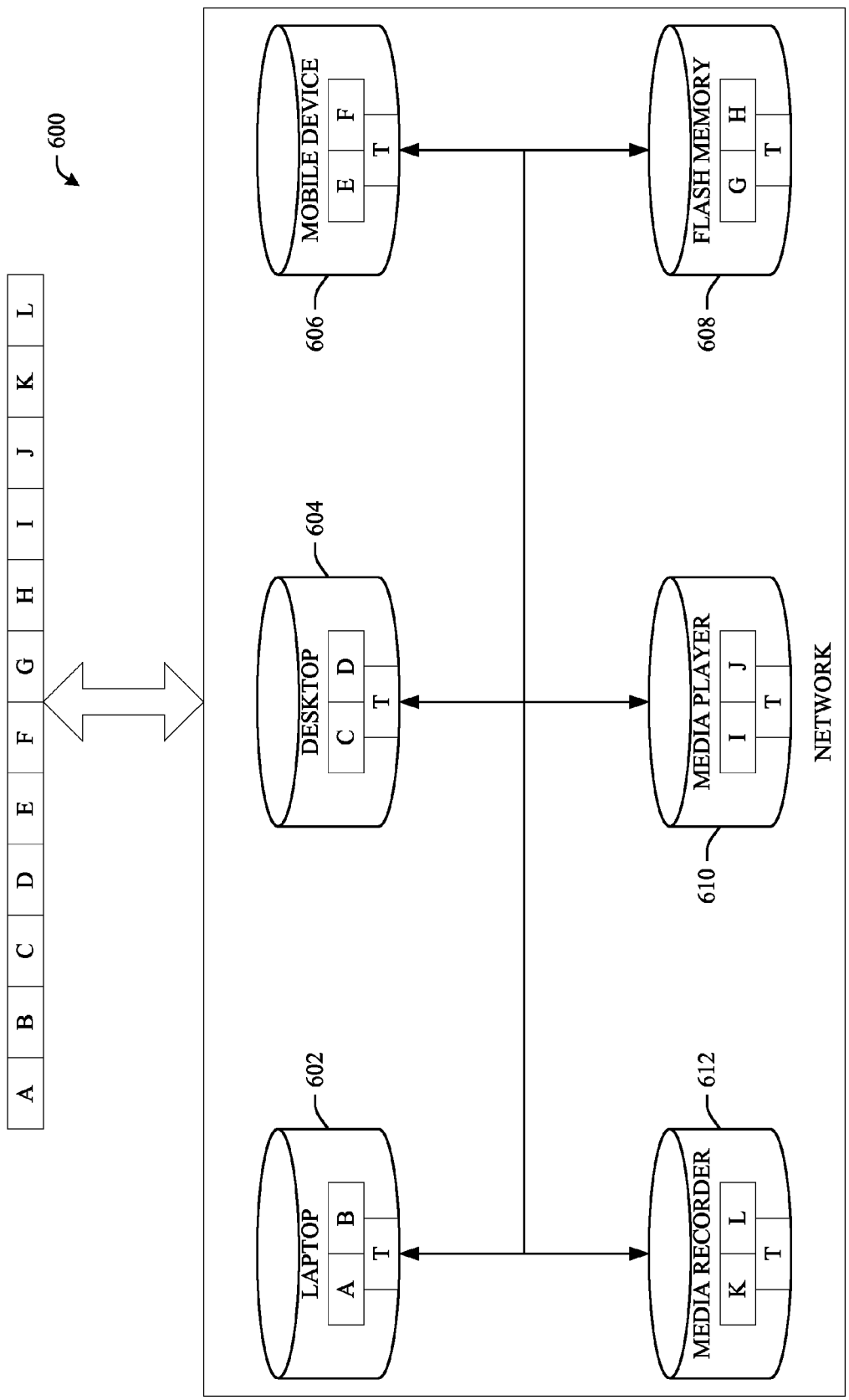
FIG. 6 illustrates a representative network configuration for retaining portions of a data set in accordance with an aspect of the subject specification.

Now referring to FIG. 6, an example system 600 is disclosed for condensing information along multiple storage mediums or devices, which can be used interchangeably. A command can be received to save an example dataset that includes hashes A-L across numerous devices/storage mediums. When the devices/mediums are inter-related, storing the information multiple times can become redundant and thus not an efficient use of resources. Therefore, different portions of the dataset can be retained upon different devices/mediums and the device/mediums can have access to the other portions. According to one embodiment, distinct portions can be retained upon the different devices, such that no device replicated data retained upon another device.

The condense component 206 of FIG. 2 can perform intelligent compression upon the dataset, where different compression algorithms are used to create different files that are retained upon devices. A user can request that a photograph be stored upon a laptop 602 and a desktop 604. Different compression algorithms can be used such that distinct files are created with reciprocal pointers to one another.

In the disclosed example, the laptop 602, desktop 604, mobile device 606, removable flash memory 608, media player 610, and media recorder 612 can reside as member of a network and retain different and oftentimes distinct portions of the dataset. In addition, the different devices can retain a table T that directs a device to locations of other portions of the dataset. For example, the laptop 602 can include hashes A and B, which is a grouping that results from lossy compression of the dataset. While the hashes A and B can be used to reconstruct the dataset, the reconstruction can be imperfect. The table T can be used to gather information about other available hashes that relate to the dataset and the laptop 602 can use the table to determine if other hashes should be analyzed in order to make an improved reconstruction. As a result of the aforementioned example, the entire dataset can be accessible to the six devices while there is consumption of nearly a same amount of space as the dataset itself with additional storage consumed by mere tables and/or pointers. Moreover, if a device is removed such as the flash memory 608, then the flash memory 608 can still produce a reconstruction of the dataset based upon a compressed file retained and the other five devices can not only produce their own reconstructions, but also leverage off the other five devices.

While depicted as different devices in a network, it is to be appreciated that other implementations can be practiced. For example, different storage devices can reside upon one computer, where example storage devices include Random Access Memory, Read-Only Memory, magnetic tape, hard disk, flash memory, and the like. In addition, not all hashes/information needs to be retained as is disclosed in FIG. 6 to implement aspects disclosed herein. Five devices could retain two hashes except the flash memory 608 that retains just a table. While the complete dataset is not reconstructable, a high-quality reconstruction can still occur. Moreover, while the drawing depicts that retaining devices share equally amounts of information—two hashes—different levels of compression and retained information can very between devices.

Figure 7:
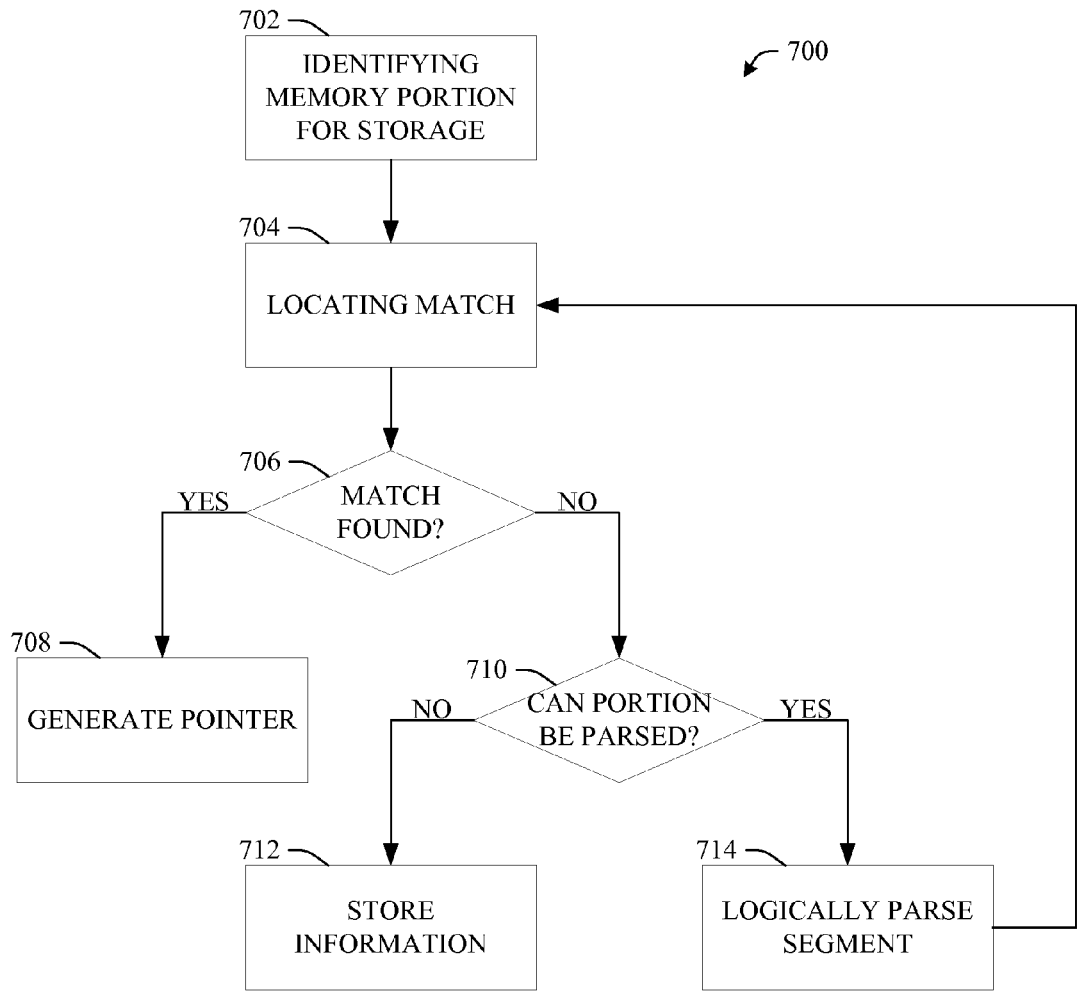
FIG. 7 illustrates a representative methodology for efficiently storing information in accordance with an aspect of the subject specification.

Now referring to FIG. 7, an example methodology 700 is disclosed for retaining information in an improved location. A memory portion can be identified for storage at action 702. Commonly a user makes a request or a request is automatically generated to retain a data portion. In addition to identifying data for storage, relevant metadata can be collected, such as when storage is to occur, a desired location for storage, and the like.

A match to information identified for storage can be located through event 704. Commonly, a check is made for new information saved to a system to be compared against existing data. For instance, '.pst' files generally have large amounts of redundant data that can be matched and can be manipulated to gain storage that is more efficient. However, according to an alternate embodiment, the methodology 700 can operate upon a system with existing saves, where a check is made for redundant storage.

A check 706 can occur to determine if a match is found at event 704. If a match is found, then a master copy of redundant information can be designated and a pointer can be generated for retention upon subsequent locations at act 708. Intelligent selection of an optimized storage location to which other locations retain a pointer can occur in accordance with aspects disclosed herein.

If a match is not found, then a further check 710 can take place to determine if the data portion requested to be saved can be logically parsed into smaller portions. If information cannot be logically parsed, then information can be stored through event 712. Different scenarios can occur that make logically parsing information impractical. Generally, when information is divided down to a smallest unit, such as a hash, then division can no longer occur and data is saved. However, it is also possible that a logical grouping cannot be effectively made and it is considered a waste of system resources to make an illogical grouping and proceed with matching. In both the aforementioned scenarios as well as other scenarios, a result can be storage of identified information.

If it is determined that logical parsing can occur, then implementation can take place at event 714. Once division occurs of a memory portion, the methodology 700 can return to event 704. Subsequent events can occur with relation to the divided memory portions independent of one another. The cycle can continue until all memory is accounted for, such as pointers being created, information being stored, data being disregarded, and the like.

Figure 8:
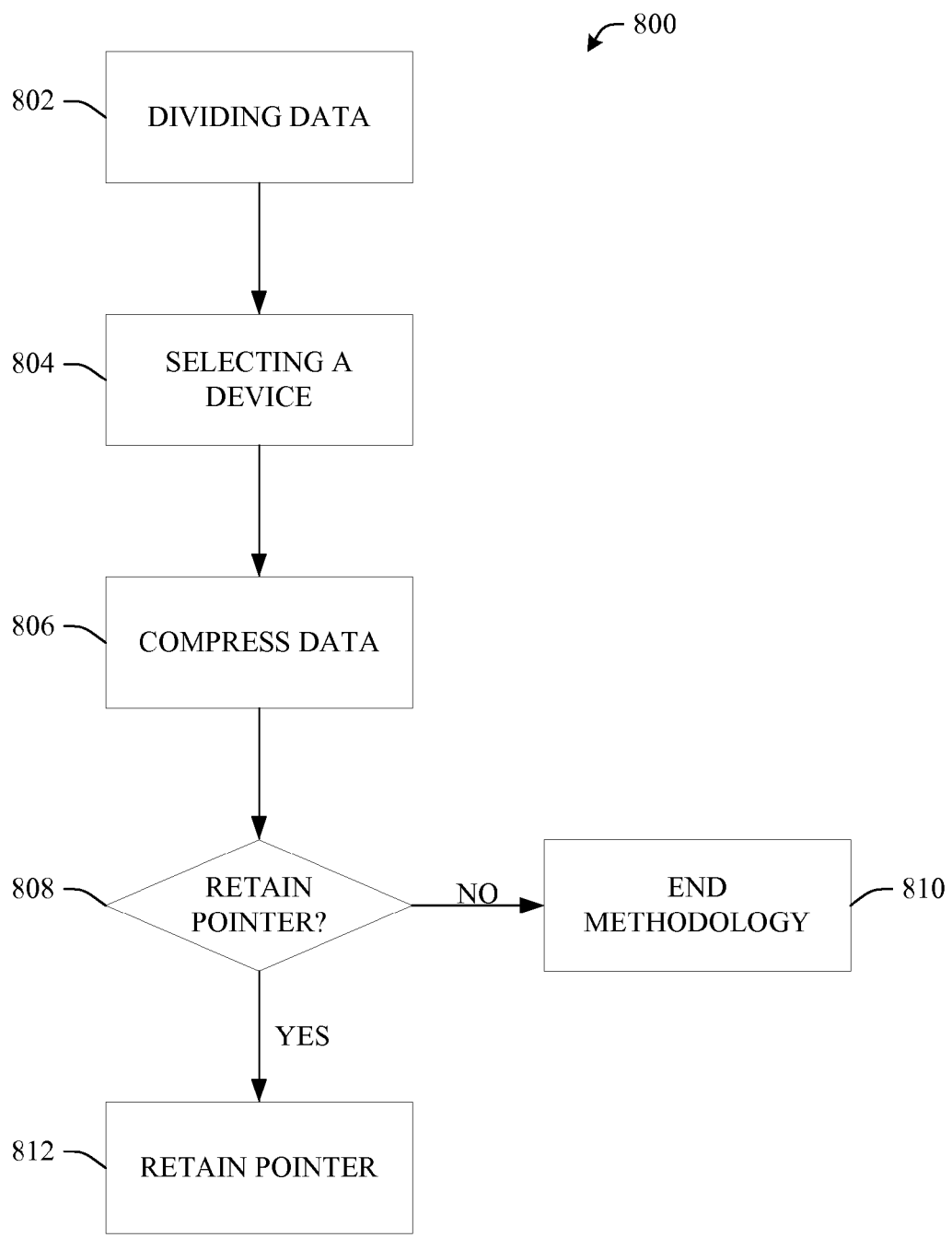
FIG. 8 illustrates a representative methodology for associating a pointer with compressed information in accordance with an aspect of the subject specification.

Now referring to FIG. 8, an example methodology 800 is disclosed for compressing data logically to improve reconstruction upon multiple locations. Data can be designated for compression, where in addition to compression, a pointer can be supplied to information that can be used to reconstruct/decompress the data. The information that is pointed to can be an original version of the compressed information, another aspect of original data, and the like. Initially, data that is to be saved in a compressed format can be divided at event 802. The division allows for different aspects to be retained on different devices/mediums and therefore redundancy of storage can be reduced. Thus, dividing at least a part of original data into at least two portions occurs. According to one aspect, division can include creating to copies of data, where the data is to be subjected to different compression algorithms or at least one copy is retained as an original.

Certain devices can be more beneficial for saving compressed data, such as a location with limited storage, while other locations can benefit for assistance, such as a hard drive with size to retain an original version. Selection of an improved device to retain the compressed data or the information can take place at act 804. According to one embodiment, selection is performed intelligently (e.g., through artificial intelligence techniques) on if at least a portion of the compressed data or the information should be stored locally or remotely. If local storage is selected, then there can also be selection on a medium upon which storage can occur. Moreover, if remote storage is selected, a particular location and/or medium can be chosen. Additionally, act 804 can operate to implement the selection, where the selection is based upon at least one economic factor, at least one performance factor, at least one contextual factor, or a combination thereof.

There can be compressing data in a lossy manner upon at least one selected device at act 806. This can include storage of the compressed data as part of act 806, where compressed data is retained upon a different storage device than the information that is intended to assist in reconstituting the compressed data into a more original context. For example, the compressed information can be retained upon flash memory while original data can be placed on battery backed memory. Storing of data can take place before or after compression. Once data is compressed, a check 808 can occur to determine if a pointer to assistance information should be retained. If it is determined that a pointer should not be retained, then the methodology 800 can end at block 810. In an illustrative instance, if compressed information is retained upon a mobile device, a pointer can be deemed wasteful and unnecessary if it is anticipated the mobile device will be out of communication with an entity that retains assistance information.

Upon a positive determination, there can be retaining a pointer to an information store that holds information related to the data at event 812, the information enables a result of decompressing the data to be closer to original data. Enablement can include comparing the result with the information, where the information provides missing portions. Commonly, the pointer directs to the original data. However, the pointer can direct to other locations and information, such as a different aspect of an original file. A compressed file can retain multiple pointers that direct to different locations and thus creating a more accurate result.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
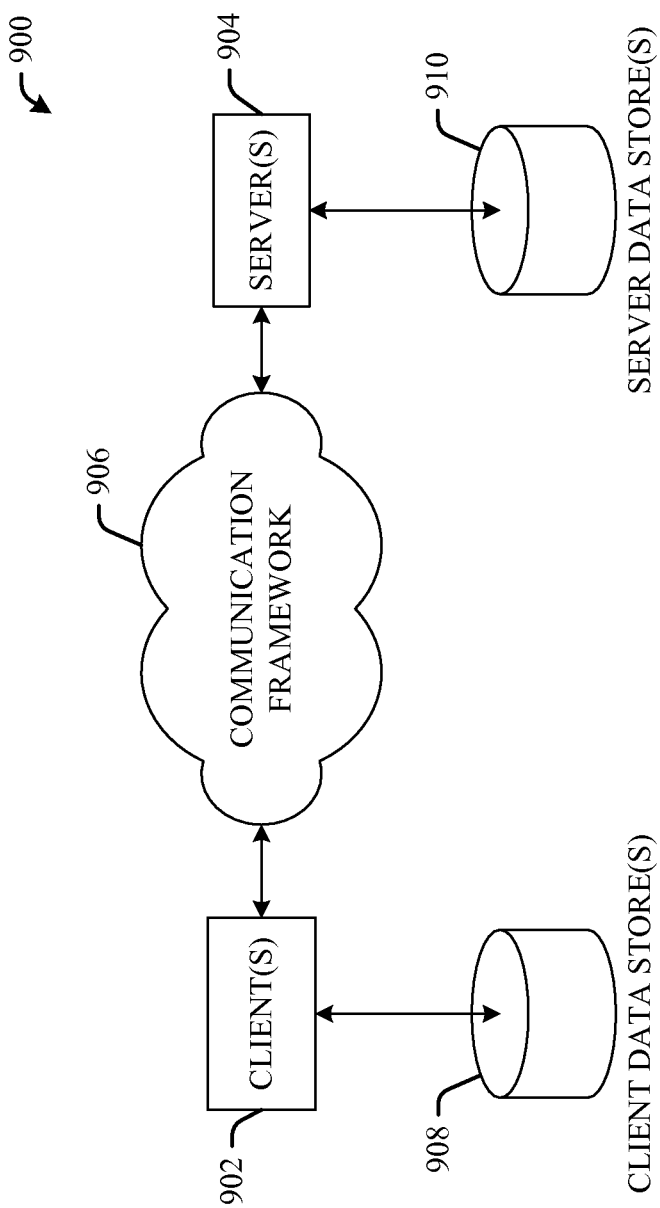
FIG. 9 illustrates an example of a schematic block diagram of a computing environment in accordance with an aspect subject specification.
Figure 10:
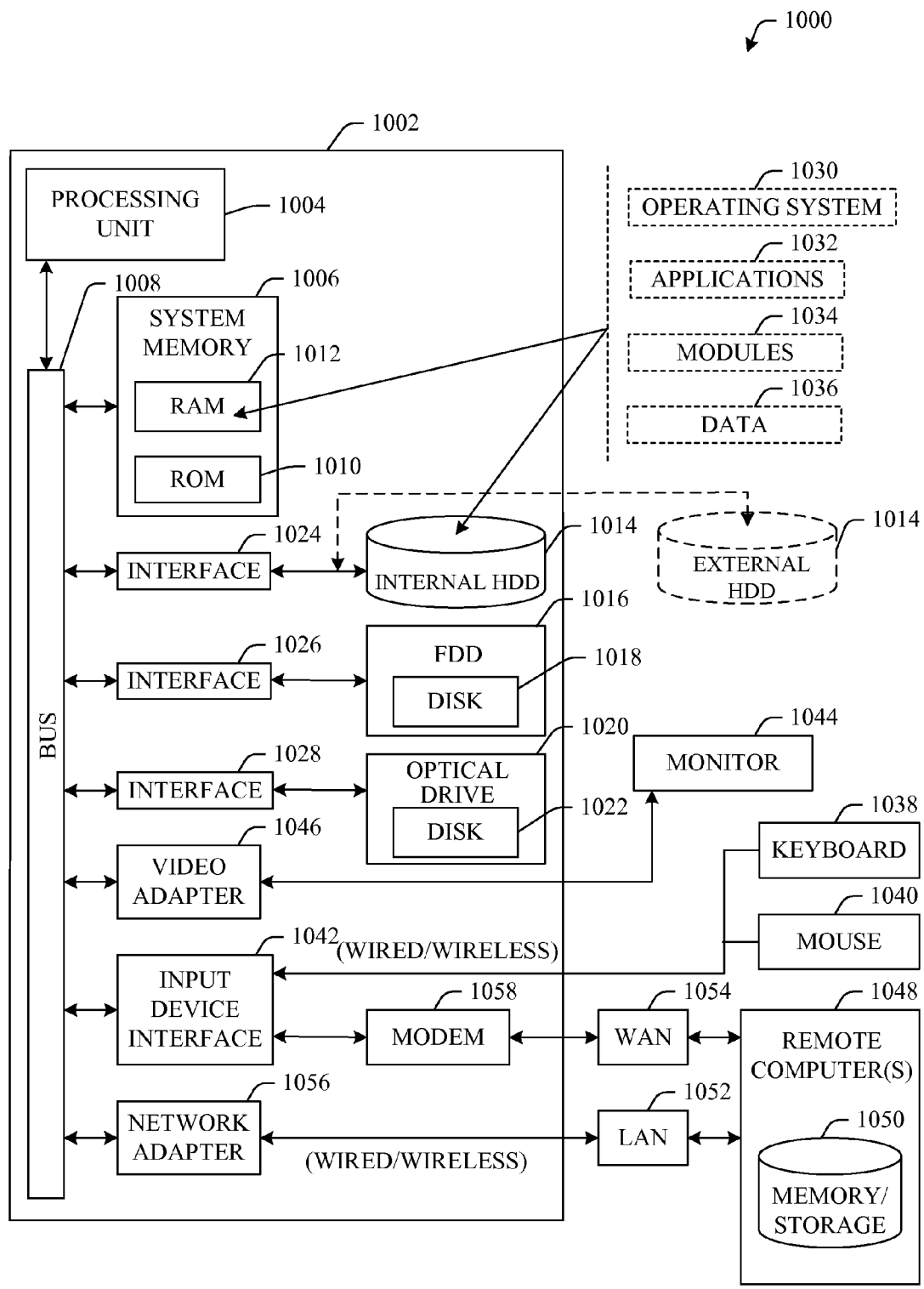
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch ... ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for data storage, comprising:
   one or more processors; and
   a memory that includes a plurality of computer-executable components, the plurality of computer-executable components comprising:
      a check component that determines whether a memory unit is retained at an auxiliary storage location when the memory unit is to be stored at a primary storage location;
      a supply component that places a pointer in the primary storage location in response to the memory unit being retained in the auxiliary storage location, the pointer providing access to a lossy compressed version of the memory unit in the auxiliary storage location; and
      a division component that determines whether the memory unit is logically divisible into memory unit portions in response to the check component determining that the memory unit is not retained in the auxiliary storage location; and
      a retention component that stores the memory unit in the primary storage location in response to the division component further determining that the memory unit is logically indivisible.

2. The system of claim 1, further comprising a parse component that is used by the division component to logically divide the memory unit into the memory unit portions.

3. The system of claim 2, further comprising an artificial intelligence component that is used by the parse component to make at least one inference or at least one determination in relation to logically dividing the memory unit.

4. The system of claim 2, further comprising a standard component that provides at least one rule to the parse component in relation to logically dividing the memory unit.

5. The system of claim 2, wherein the parse component further logically divides each memory unit portion into additional memory unit portions.

6. The system of claim 2, wherein the parse component logically divides the memory unit into the memory unit portions to create at least one of a smallest number of the memory unit portions or a largest average size memory unit portion.

7. The system of claim 2, wherein the retention component stores the memory unit portion in the primary storage location in response to the check component determining that the memory unit portion is not retained at the auxiliary storage location.

8. The system of claim 1, wherein, in response to the division component determining that the memory unit is logically divisible into memory unit portions, the check component further determines whether a memory unit portion of the memory unit portions is retained at an additional auxiliary storage location, and the supply component places an additional pointer in the primary storage location for accessing the memory unit portion in response to the check component determining that the memory unit portion is retained at the auxiliary storage location.

9. The system of claim 8, wherein the additional pointer provides access to a lossy compressed version of the memory unit portion in the additional auxiliary storage location.

10. The system of claim 1, wherein the pointer provides a path to a location of the memory unit retained in the auxiliary storage location.

11. The system of claim 1, wherein the retention component stores the memory unit portion in the primary storage location in response to the division component further determining that the memory unit portion is not retained at the auxiliary storage location.

12. The system of claim 1, further comprising an evaluator component that selects the primary storage location to store the memory unit based on at least one of an economic factor, a performance factor, or a contextual factor.

13. The system of claim 12, wherein the contextual factor includes a likelihood that the primary storage location is to be disconnected from a network.

14. The system of claim 1, further comprising a condense component that compresses the memory unit through lossy compression to generate the lossy compressed version.

15. A computer-readable memory storing computer-executable instructions that, when executed, cause one or more processors to perform acts comprising:
   dividing a memory unit that is to be stored in a storage location logically into a first memory unit portion and a second memory unit portion;
   determining whether the first memory unit portion and the second memory unit portion are stored in one or more alternative storage locations;
   placing a pointer to a lossy compressed version of the first memory unit portion in the storage location in response to determining that the lossy compression version of the first memory unit portion is stored in an alternative storage location;

storing the first memory unit portion in the storage location in response to a likelihood prediction indicating that the storage location is to be communicatively separated from another alternative storage location storing a duplicate copy of the first memory unit portion; and storing the second memory portion in the storage location in response to determining that no duplicate copy or lossy compression version of the second memory portion is stored in the one or more alternative storage locations.

16. The computer-readable memory of claim 15, further comprising selecting the storage location from multiple storage locations based on at least one of an economic factor, a performance factor, or a contextual factor.

17. The computer-readable memory of claim 15, wherein the determining includes scanning the one or more alternative storage locations for the first memory unit portion or the second memory unit portion.

18. The computer-readable memory of claim 15, wherein the memory unit includes one of an audio file, a video file, or a digital photograph.

19. A method comprising:

dividing a memory unit that is to be stored in a storage location logically into a first memory unit portion and a second memory unit portion;

determining whether the first memory unit portion and the second memory unit portion are stored in one or more alternative storage locations;

placing a pointer to a lossy compressed version of the first memory unit portion in the storage location in response to determining that the lossy compression version of the first memory unit portion is stored in an alternative storage location;

storing the first memory unit portion in the storage location in response to a likelihood prediction indicating that the storage location is to be communicatively separated from another alternative storage location storing a duplicate copy of the first memory unit portion; and storing the second memory portion in the storage location in response to determining that no duplicate copy or lossy compression version of the second memory portion is stored in the one or more alternative storage locations.

20. The method of 19, further comprising selecting the storage location from multiple storage locations based on at least one of an economic factor, a performance factor, or a contextual factor.

* * * * *